US012597296B2

(12) United States Patent
Blais et al.

(10) Patent No.: US 12,597,296 B2
(45) Date of Patent: Apr. 7, 2026

(54) COMMUNICATING VEHICLE SIGNAL INFORMATION USING EXTENDED IDENTIFIERS

(71) Applicant: BlackBerry Limited, Waterloo (CA)

(72) Inventors: Pierre Pierre Blais, Kanata (CA); Geordon Thomas Ferguson, Mississauga (CA)

(73) Assignee: BlackBerry Limited, Waterloo (CA)

( * ) Notice: Subject to any disclaimer, the term of this patent is extended or adjusted under 35 U.S.C. 154(b) by 305 days.

(21) Appl. No.: 18/175,737

(22) Filed: Feb. 28, 2023

(65) Prior Publication Data

US 2024/0290139 A1 Aug. 29, 2024

(51) Int. Cl.

*G05D 1/00* (2024.01)
*G07C 5/00* (2006.01)
*G07C 5/08* (2006.01)

(52) U.S. Cl.

CPC ............... *G07C 5/008* (2013.01); *G07C 5/08* (2013.01)

(58) Field of Classification Search

CPC ...................................................... G07C 5/008
See application file for complete search history.

(56) References Cited

U.S. PATENT DOCUMENTS

| | | | | |
|---|---|---|---|---|
| 10,217,304 | B2 * | 2/2019 | Chen | G07C 9/00571 |
| 2018/0150372 | A1 | 5/2018 | Nachimuthu et al. | |
| 2021/0103658 | A1 * | 4/2021 | Soryal | G06F 21/51 |
| 2021/0200501 | A1 * | 7/2021 | Stankoulov | G06F 3/0481 |

OTHER PUBLICATIONS

YouTube video clip entitled "How to Connect your iPhone to your Car, Truck, or SUV," 1 page, uploaded on Nov. 22, 2016 by user "Croton Auto Park" [retrieved on Feb. 20, 2025]. Retrieved from the Internet: <https://www.youtube.com/watch?v=iFni88j1JDY>. (Year: 2016).*

Extended European Search Report in European Appln. No. 24159059.5, mailed on Jul. 16, 2024, 9 pages.

Grewe et al., "On the Design of an Information-Centric Networking Extension for IoT APIs" 2021 IEEE 94th Vehicular Technology Conference (VTC2021—Fall), Sep. 2021, 6 pages.

W3.org [online], "Vehicle Information Service Specification" Feb. 2018, retrieved on Feb. 22, 2019, retrieved from URL <www.w3.org/TR/vehicle-information-service/>, 69 pages.

Extended European Search Report in European Appln. No. 24197425.2, mailed on Jan. 23, 2025, 11 pages.

Roth et al., "Analysis and validation of perception sensor models in an integrated vehicle and environment simulation." Proceedings of the 22nd Enhanced Safety of Vehicles Conference, 2011, 9 pages.

* cited by examiner

*Primary Examiner* — Vivek D Koppikar
*Assistant Examiner* — Paul W Arellano
(74) *Attorney, Agent, or Firm* — Fish & Richardson P.C.

(57) ABSTRACT

Systems, methods, and software can be used to communicates vehicle signals. In some aspects, one example method includes: receiving, at a server, a query for a vehicle signal; and transmitting, from the server, a response message comprising an identifier of the vehicle signal, wherein the identifier comprises a representation of a name of the vehicle signal and a definition of at least one other element of the vehicle signal.

11 Claims, 4 Drawing Sheets

COMMUNICATING VEHICLE SIGNAL INFORMATION USING EXTENDED IDENTIFIERS

TECHNICAL FIELD

The present disclosure relates to communicating vehicle signal information.

BACKGROUND

A vehicle can include a large number of sensors emitting or generating signals that are constantly reporting state changes in what they are monitoring. The vehicle uses these signals to determine the status of different aspects of the vehicle. The vehicle or an entity in the vehicle can further set different values for these signals to control the operation of the vehicle.

DESCRIPTION OF DRAWINGS

Like reference numbers and designations in the various drawings indicate like elements.

DETAILED DESCRIPTION

Figure 1:
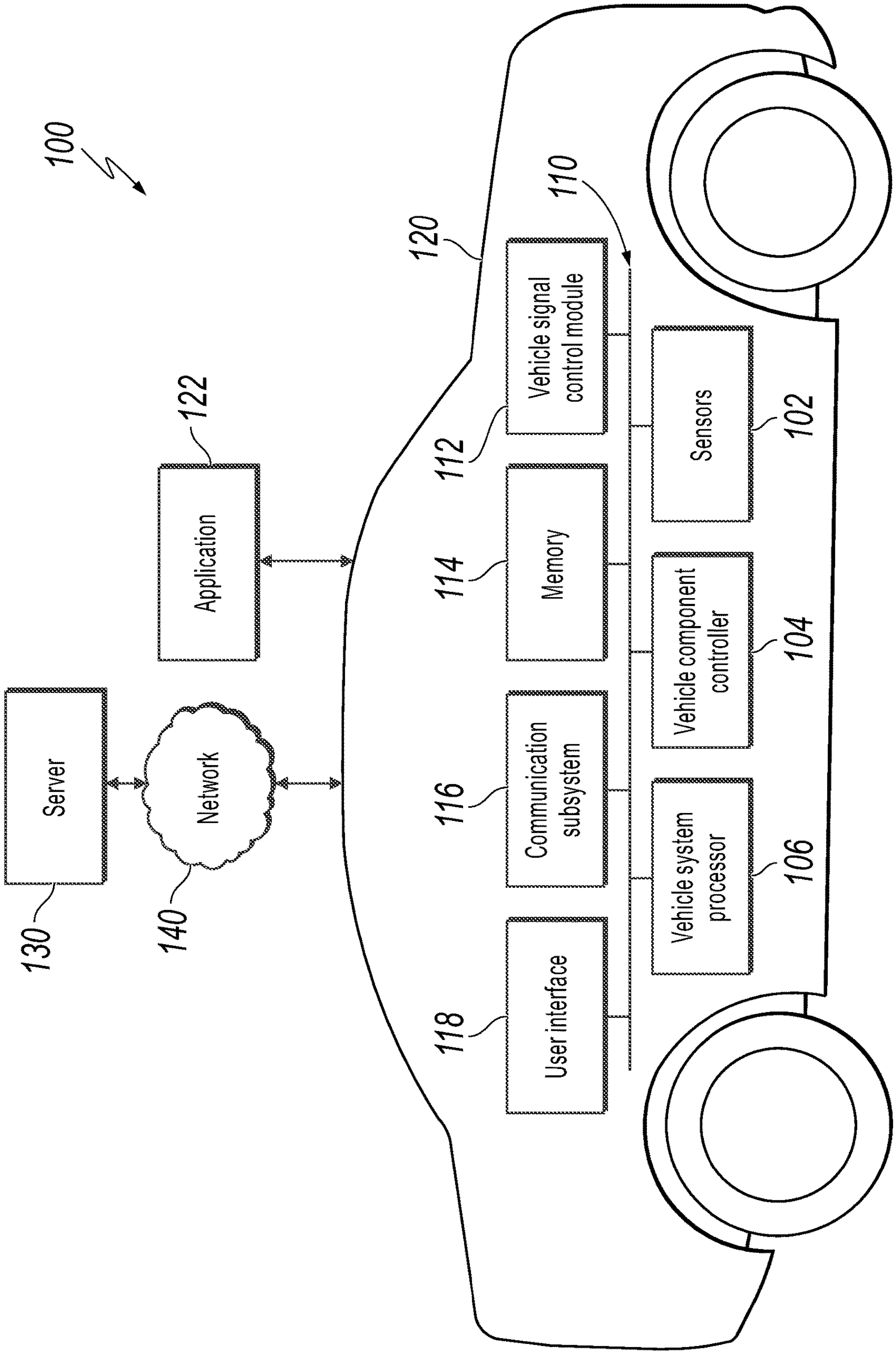
FIG. 1 is a schematic diagram showing an example communication system that communicates vehicle signals, according to an implementation.

In some cases, vehicle signals may be defined in a signal catalog using Connected Vehicle Systems Alliance (COVESA)'s Vehicle Signal Specification (VSS). Such a signal catalog provides a normative definition of a set of signals that could be emitted or generated by sensors in a vehicle. The definition of the signal may include definitions of different elements of the signal, e.g., the data type, the unit, and etc.

In some cases, the signal catalog can evolve as new signal definitions are added, changed, or deleted. For example, the data type of a signal may change from integer to float. To keep track of these changes, versioning may be used. For example, the COVESA signal catalog has different versions, some signals in one version may have different definitions than in another version. Other entities that create and manage their own signal catalogs, e.g., different vehicle manufacturers, may also have their own versions of their signal catalogs. In some cases, the term "lineage" can be used to represent a combination of the entity that created the signal catalog (also referred to as provenance, e.g., a provenance can be standards organization such as COVESA, a vehicle manufacturer, or any other party) and the version of the signal catalog. Each provenance can define signals in their own way, leading to signal catalog from different lineages having different definitions of some signals. Therefore, definitions of the same vehicle signal, e.g., vehicle speed, may be different if the lineage of the signal is different. For example, one lineage may define vehicle speed to be in km/h, while another defines it to be in mph.

In some operations, non-native applications, e.g., application running on an external device or third-party application installed in the vehicle, or native applications need access to some of the signals. The signals can also be referred to as data entry nodes because they are defined as nodes in a signal catalog. The access may be read access, write access, or both. For the applications to correctly interpret or set vehicle signals, the application needs to understand the definition of different elements of each vehicle signal, e.g., the unit, the data type, and etc. Because the definition may be different for the same signal with different lineage, an indicator of the lineage of the signal may be included in the request for the signal or included in the response that provides the requested signal. However, this may increase the complexity to the application. The same application may be used to access different types, makes, and models of vehicles. Thus, the application may need to keep track of the definitions of the same signal across multiple lineages, which includes signal catalogs from different provenances and different versions of these signal catalogs. Each version of a signal catalog may include the definition of thousands of vehicle signals and thus adds significant burdens on the memory and processing power required for the application. Furthermore, including the lineage indicator in the request and response message for signal access may cause additional overhead in signaling transmission.

In some implementations, the definition of different elements of the vehicle signal can be used to generate an extended identifier for the vehicle signal. Thus, the extended identifier can represent both the identity of the signal, e.g., the name of the signal, and other definition (or semantics) of the signal, including e.g., the data type or the unit of the signal. In other words, the extended identifier can represent the name of the signal as well as the lineage of the signal. The application and the vehicle can use the extended identifier in the request and response of the vehicle signal. The vehicle signal can be correctly interpreted and set as long as the application and the vehicle use the same extended identifier. The approach described in this disclosure provides an efficient way to communicate the vehicle signals, protect safety of the vehicle operation, and reduce complexity of the entities that request or provide the signal. The described approach also provides an efficient way to determine whether the definitions (or semantics) of a signal from two lineages are the same by simply comparing the extended identifier. FIGS. 1-4 and associated descriptions provide additional details of these implementations.

FIG. 1 is a schematic diagram showing an example communication system 100 that communicates vehicle signals, according to an implementation. At a high level, the example communication system 100 includes a vehicle 120 that is communicatively coupled with an application 122. The vehicle 120 is also communicatively coupled with a server 130 over a network 140.

The vehicle 120 can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. In the illustrated example, the vehicle 120 includes one or more sensors 102, a vehicle component controller 104, a vehicular system processor 106, a communication subsystem 116, a user interface 118, memory 114, and vehicle signal control module 112, that are connected to a bus 110.

In some cases, a vehicle can include one or more sensors. The one or more sensors can generate information, e.g., video or audio information, that reflect the surroundings or environment inside of the vehicle. Examples of the sensors can include cameras, microphones, laser, radar, ultrasonic, light detection and ranging (LIDAR), or any other sensors.

The vehicle 120 includes one or more sensors 102 that detect or measure information for the vehicle 120. Examples of the sensors 102 can include sensors that capture environmental information that is external to the vehicle 120, such as cameras, microphones, laser, radar, ultrasonic, light detection and ranging (LIDAR), and the like. These sensors can provide environmental inputs for an automatic processing platform operating on the vehicle 120 to make automatic decisions. Examples of the sensors 102 can also include devices that capture information that is internal to the vehicle 120, such as monitors for components such as engine, battery, fuel, electronic system, cooling systems, and the like. These sensors can provide operation status and warnings to the automatic processing platform operating on the vehicle 120. Examples of the sensors 102 can also include acoustic sensors that can detect the sound level inside the vehicle 120. The acoustic sensors can determine the noise level inside the vehicle 120 or provide input to other signal processors that determine the noise level.

The vehicle 120 includes a vehicle component controller 104. Although illustrated as a vehicle component controller 104 in FIG. 1, the vehicle 120 can include more than one vehicle component controllers 104. The vehicle component controller 104 represents a controller that controls the operation of a component on the vehicle 120. Examples of the components can include engine, accelerator, brake, radiator, battery, steering wheel, transmission system, cooling system, electrical system, entertainment system, and any other components of the vehicle 120. For example, the vehicle component controller 104 can control the speaker system of the vehicle 120, including controlling the volume, balance, fade, and any other settings for audio output inside the vehicle 120. The vehicle component controller 104 can operate a respective component automatically, according to input from the vehicular system processor 106, or a combination thereof. In some implementations, the vehicle component controller 104 can include a data processing apparatus.

The vehicular system processor 106 can include one or more processing components (alternatively referred to as "processors" or "central processing units" (CPUs)) configured to execute instructions related to one or more of the processes, steps, or actions for the automatic processing platform operating on the vehicle 120. Generally, the vehicular system processor 106 executes instructions and manipulates data to perform the operations of the automatic processing platform. The vehicular system processor 106 can receive inputs from the sensors 102 and generate commands to the vehicle component controller 104. In some cases, the vehicular system processor 106 can perform automatic operations. In some cases, the vehicular system processor 106 can include a data processing apparatus.

The communication subsystem 116 can be configured to provide wireless or wireline communication for data or control information of the vehicle 120. For example, the communication subsystem 116 can support transmissions over wireless local area network (WLAN or Wi-Fi), near field communication (NFC), infrared (IR), Radio-frequency identification (RFID), Bluetooth (BT), Universal Serial Bus (USB), or any other short-range communication protocols. The communication subsystem 116 can also support Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. The communication subsystem 116 can include, for example, one or more antennas, a receiver, a transmitter, a local oscillator, a mixer, and a digital signal processing (DSP) unit. In some implementations, the communication subsystem 116 can support multiple input multiple output (MIMO) transmissions. In some implementations, the receivers in the communication subsystem 116 can be an advanced receiver or a baseline receiver.

The user interface 118 can include, for example, any of the following: one or more of a display or touch screen display (for example, a liquid crystal display (LCD), a light emitting diode (LED), an organic light emitting diode (OLED), or a micro-electromechanical system (MEMS) display), a keyboard or keypad, a trackball, a speaker, or a microphone. The user interface 118 can also include an I/O interface, for example, a universal serial bus (USB) interface.

The memory 114 can be a computer-readable storage medium. Examples of the memory 114 include volatile and non-volatile memory, magnetic media, optical media, random access memory (RAM), read-only memory (ROM), removable media, and others. The memory 114 can store an operating system (OS) of the vehicle 120 and various other computer-executable software programs for performing one or more of the processes, steps, or actions described above.

Figure 2:
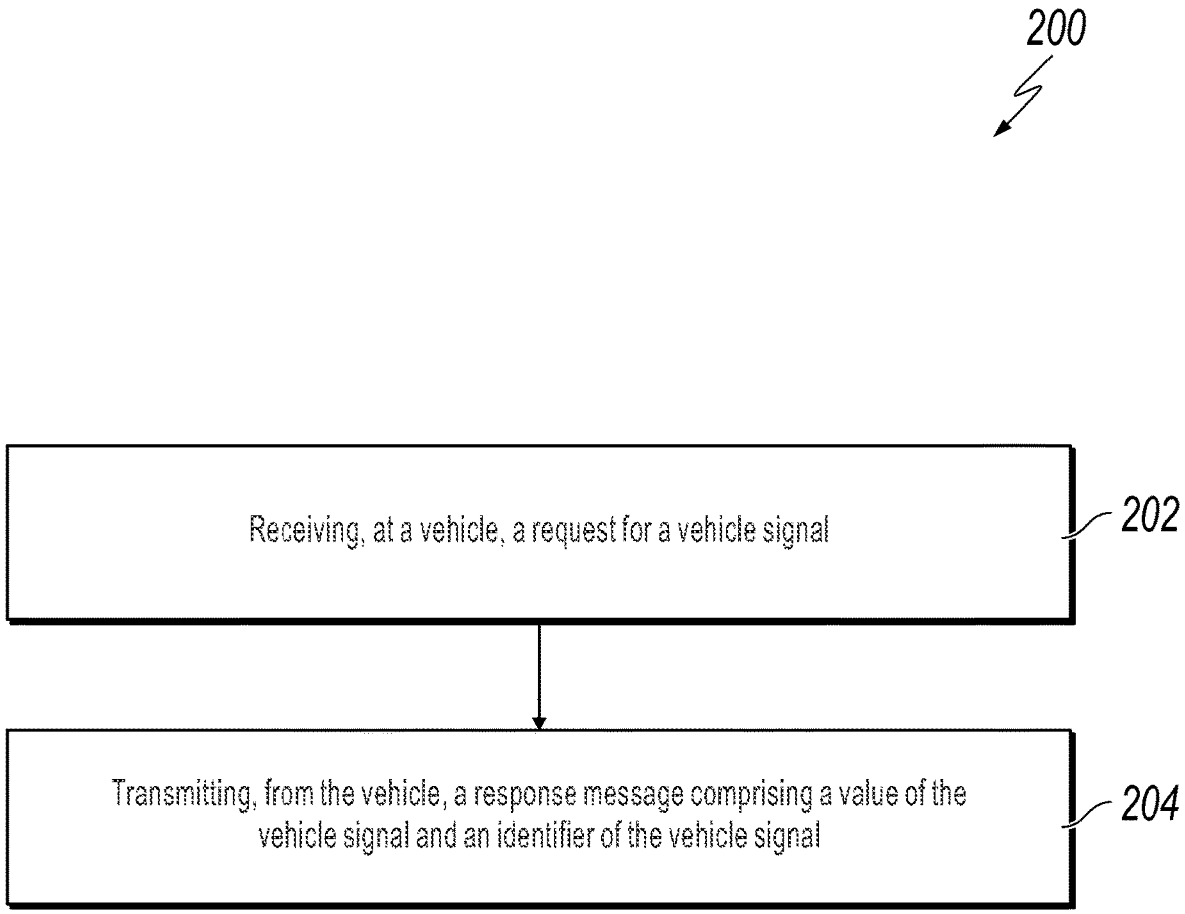
FIG. 2 is a flow diagram showing an example method that communicates vehicle signals, according to an implementation.

The vehicle signal control module 112 represents an application, a set of applications, software, software modules, hardware, or any combination thereof that can be configured to control communications of the vehicle signals of the vehicle 120. In some implementations, the vehicle signal control module 112 can receive a request for vehicle signals, e.g., from application 122. The request can include an extended identifier of the requested signal. The vehicle signal control module 112 determines whether the signal having the extended identifier is supported. The vehicle signal control module 112 sends a response message including the value of the requested vehicle signal. In some cases, the response message further includes the extended identifier. FIG. 2 and associated descriptions provide additional details of these implementations. In some implementations, the vehicle signal control module 112 can be implemented as a separate software program or part of a software program stored in the memory 114 and executed by the vehicular system processor 106.

As illustrated, the bus 110 provides a communication interface for components of the automatic processing platform operating on the vehicle 120. In some cases, the bus 110 can be implemented using a Controller Area Network (CAN) bus.

The application 122 represents an application, a set of applications, software, software modules, hardware, or any combination thereof that requests the vehicle signal. In some cases, the application can be executed on an electronic device that connects with the vehicle 120. Such an electronic device may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, or other mobile communications devices having components for communicating voice or data via a wireless or wired communication network. The electronic device can also be a peripheral device, such as a headset, a remote controller, or a display. The electronic device can connect with the vehicle 120 using short-range communication technology. The short-range communication technology can be wireless, such as BT, NFC, WLAN. The short-range communication technology can also be wired, such as USB.

In some cases, the application 122 can be installed on the vehicle 120. For example, the application 122 can be a third-party application that controls some operations of the vehicle 120. For example, the application 122 can receive and interpret vehicle signals generated from the sensors 102. The application 122 can also set the vehicle signals to control operations of the vehicle.

The server 130 represents an application, a set of applications, software, software modules, hardware, or any combination thereof that can be configured to manage vehicle signals of the vehicle 120 and their corresponding extended identifiers. In some implementations, the server 130 can receive, store, send, and adjust the extended identifiers of vehicle signals of the vehicle 120.

The example communication system 100 includes the network 140. The network 140 represents an application, set of applications, software, software modules, hardware, or combinations thereof, that can be configured to transmit data between the server 130 and the vehicle 120 in the communication system 100. The network 140 includes a wireless network, a wireline network, or a combination thereof. For example, the network 140 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, 5G, or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within its coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may, instead, include a number of sub-modules, third-party services, components, libraries, and such, as appropriate. Furthermore, the features and functionality of various components can be combined into fewer components, as appropriate.

FIG. 2 is a flow diagram showing an example method 200 that communicates vehicle signals, according to an implementation. The method 200 can be implemented by the entities shown in FIG. 1, including, for example, the vehicle 120. The method 200 shown in FIG. 2 can also be implemented using additional, fewer, or different entities. Furthermore, the method 200 shown in FIG. 2 can be implemented using additional, fewer, or different operations, which can be performed in the order shown or in a different order. In some instances, an operation or a group of operations can be iterated or repeated, for example, for a specified number of iterations or until a terminating condition is reached.

At 202, the vehicle receives a request for a vehicle signal. In some cases, the request can be received from an application, e.g., the application 122 in FIG. 1. The application can execute on an electronic device outside of the vehicle, where the request can be sent by using a wireless or wireline connection, e.g., Bluetooth, NFC, Wi-Fi, LTE, 5G, USB or any other local or wide area network communication technologies. The application can also execute on the vehicle, e.g., a third-party application that is installed on the operating system of the vehicle.

The vehicle signal represents the signals that carries information of the vehicle operations. Examples of the information carried by the vehicle signal includes information related to driving operations, e.g., speed, acceleration, location, and etc., information related to entertainment operations, e.g., volumes of audio speakers, information related to cabin operations, e.g., air conditioning (AC) setting, position of the seats, and etc., and any other information related to the operation of the vehicle.

The request can be a read request. The read request indicates that the application requests to obtain the information represented by the vehicle signal, e.g., the speed of the vehicle. Alternatively, or additionally, the request can be a write request. The write request indicates that the application requests to set the information represented by the vehicle signal, e.g., write the volume of a speaker on the vehicle.

In some cases, Vehicle Signal Specification (VSS) developed by Connected Vehicle Systems Alliance (COVESA) can be used to provide the common format/structure for the vehicle signals. VSS introduces a domain taxonomy for vehicle signals that can be used as standard in automotive applications to communicate information around the vehicle. VSS defines vehicle signals, in a tree like structure, in the sense of classical attributes, sensors, and actuators with the raw data communicated over vehicle buses and data that is more commonly associated with the infotainment system alike. COVESA defines a catalog of signals. More generally, a catalog of signals can be referred to as a "signal catalog". The signal catalog includes a set of data entry nodes, each of which defines a vehicle signal using a number of elements such as signal type (e.g., sensor, actuator, attribute), datatype (e.g., integer, floating point, string, etc.), and unit (e.g., km/h, Celsius, etc.). The signal catalog is organized into a tree structure where data entry nodes are the leaves and branch nodes regroup sets of data entry nodes as well as sub-branches. In some cases, different types of vehicles have different signal catalogs.

Tables 1 is an example of the signal structure/format defined for the vehicle signals according to the COVESA VSS:

TABLE 1 example vehicle signals (signal type and data type)

| Node Name | Signal Type | Data Type |
|---|---|---|
| Vehicle | Root | |
| Vehicle.Speed | sensor | uint16 |
| Vehicle.Cabin | Branch | |
| Vehicle.Cabin.HVAC.Station.Row1.Left.Temperature | Sensor | int8 |

As seen from Table 1 above, a dot notates a name path to identify a component as a branch node (a set of children branch nodes or data entry nodes) or a data entry (leaf) node (a sensor, actuator, or attribute). A sensor denotes a one-way signal originating from the vehicle (e.g., generated according to measurement of one or more sensors in the vehicle). An actuator denotes a two directional signal that can be set or get values (i.e., the signal can indicate the current status or be used to set the status). A branch is a node in a tree structure. An attribute is typically a fixed value. The sensors/actuators typically have a publisher (or producer) that updates the signal value continuously when a change occurs in a sensor, while an attribute has a set value that should typically not change more than once per ignition cycle. In some cases, the signals in Table 1 can be implemented using Extensible Markup Language (XML), JavaScript Object Notation (JSON) scripts, or another encoding format.

In addition to the signal type and data type, a node that represents a vehicle signal can include other elements, e.g., min (representing minimum value of the signal), max (representing maximum value of the signal), and etc. A set or subset of elements associated with a vehicle signal or node is also referred to as the semantics of the vehicle signal or node. In some cases, semantics of the signal excludes the element of signal name. For example, Table 2 shows example elements of a node:

| Element name | Description |
|---|---|
| Name | A dotted representation of a signal (e.g., Vehicle.Speed) |
| Signal Type | Whether the data entry node represents a sensor, an actuator, an attribute, or a branch node. |
| Data type | Whether the data entry node is an integer, a floating point number, a string, etc. |
| Unit | If applicable, a unit for the signal (e.g., km/h, Celsius, etc.) |
| Min | If applicable, the minimum value for the signal. |
| Max | If applicable, the maximum value for the signal. |
| Allowed | If applicable, a list of allowed values for the signal. |
| Default | For attributes, a default value for the signal. |
| Description | A textual description of the signal. |
| Comment | Optionally, additional information describing the signal. |

For each vehicle signal, a definition may be assigned to each element. For example, for Vehicle. Speed, the Unit may be defined as either kilometer/hour or mile/hour. The Min and Max may be defined as the minimum speed or the maximum speed of the vehicle. In another example, for Vehicle.Cabin.HVAC.Station.Row1.Left. Temperature, the Unit may be defined as either Celsius or Fahrenheit.

In some implementations, the definition of the element for each vehicle signal can be set by the manufacturer of the vehicle. For example, the manufacturer can set the definition based on the target operating region of the vehicle. For a vehicle that operates in the United States, the Unit of the signal Vehicle. Speed may be set to mile/hour, and the Unit of the signal Vehicle.Cabin.HVAC.Station.Row1.Left. Temperature may be set to Fahrenheit. On the other hand, for a vehicle that operates in Canada, Europe, or Asia, the Unit of the signal Vehicle. Speed may be set kilometer/hour to and the Unit of the signal Vehicle.Cabin.HVAC.Station.Row1.Left. Temperature may be set to Celsius. In some cases, the definition of the element can be set based on the model of the vehicle, e.g., different models may have different Min/Max for Vehicle. Speed. Different models may also define different data type of Vehicle. Speed, e.g., integer or float. Alternatively or additionally, the definition of the element for some vehicle signals can be set or adjusted by the operation administrator of the vehicle, the owner of the vehicle, the driver of the vehicle, either locally or remotely, or any combination thereof. The definition of the element can be set when the operating system of the vehicle is installed in the vehicle. Alternatively, or additionally, the definition of the element can also be set directly at a user interface of the vehicle, or through a server, e.g., the server 130 in FIG. 1.

In some cases, an identifier can be assigned to each vehicle signal. For example, the VSS defines a Universally Unique Identifier (UUID) for each signal. The UUID is created from the name of the signal. In some cases, the request can include the name of the requested vehicle signal, e.g., UUID. The UUID does not include information of other elements, e.g., Unit or Data Type of the vehicle signal. Therefore, the UUID does not represent the semantics of a signal (or how to interpret the signal).

In some implementations, an identifier that includes information of other elements (elements excludes the signal name) can be used. Such an identifier can be referred to as an extended identifier, e.g., extended UUID (EUUID). Other names of the identifier can also be used. In addition, to indicate the identity or the name of the signal, the EUUID can also include the definition of one or more elements of the signal (i.e., the semantics of the signal). By including the element information in the extended identifier, the vehicle signal can be correctly interpreted and set as long as the same extended identifier are used to refer to the signal. This approach provides an efficient way to communicate the vehicle signals with different lineages that may have different definitions of the elements (or different semantics) for the same signal.

In some implementations, the definition of one or more elements of a vehicle signal can be concatenated into a combined value. In one example, the definition of each element of the vehicle signal can be represented by a string, e.g., for Vehicle. Speed, the definition of the Unit can be represented as "mile/hour" or "m/h" or "kilometer/hour" or "km/h", and the definition of the Min and Max can also be represented as the string "0" and "160", respectively. These strings can be concatenated to form a joint string. The joint string can be further concatenated with the name of the signal to form a combined string uniquely representing the lineage of the node.

Alternatively or additionally, the definition of one or more elements of the vehicle signal can be represented by a value. For example, for Vehicle. Speed, the definition of the Unit can be represented by using enumerated value, e.g., 0 for "mile/hour" and 1 for "kilometer/hour", and the definition of the Min and Max can also be represented as an integer value 0 and 160, respectively. These numbers can be concatenated to form a joint value. The joint value can be further concatenated with the name of the signal to form a combined string.

These approaches can be used in a combination, e.g., the definition of some elements can be represented by using a string, while the definition of some elements can be represented by using a value. Other encoding methods can also be used to represent the definition of the elements. These representations can be concatenated to form a combined string. In some cases, instead of using the name of the signal that is represented as a string, e.g., "Vehicle. Speed", the UUID or an abbreviated form of the UUID of the Vehicle. Speed can be used to represent the name of the signal and be combined with the definition of other elements to form the combined string. The abbreviated form of the UUID can be generated by using the UUID (or the name of the signal) as input to a hashing function to generate a hash product that is shorter than the UUID, e.g., 16 bits, 32 bits, or 64 bits.

In some cases, the combined string discussed previously can be used as the EUUID. However, it may be beneficial to define the EUUID with a fixed length, e.g., 64 bits or 128 bits. This helps to simplify the signaling exchange for the vehicle signal. In one implementation, the combined string can be extended to the fixed length by filling additional "0" bits or be shortened to the fixed length by removing bits of the combined string that are over the fixed length. In another implementations, a hash function can be used. The combined string can be used as an input to the hash function to generate a hash product with the fixed length of the EUUID. Alternatively or in combination, compression algorithm can be applied to the combined string to generate the EUUID.

Because the EUUID of a signal includes the definition of the semantic-carrying elements of the signal, the same signal with different definitions of the same element will have a different EUUID. For example, the signal Vehicle. Speed that has a definition of Unit as mile/hour will have a different EUUID than a signal Vehicle. Speed that has a definition of Unit as kilometer/hour because the representation of mile/hour or kilometer/hour is included in the generation process of the EUUID, as discussed previously. Similarly, if the data type of a signal changed from one lineage of the signal catalog to another lineage of the signal catalog, the EUUID of the signal will be different for these two lineages. On the other hand, if the data type of a signal remains the same from one lineage of the signal catalog to another lineage of the signal catalog, the EUUID of the signal will be the same for these two lineages. Therefore, this approach reduces the complexity of exchanges of vehicle signals, e.g., between the application and the vehicle. The application does not need to keep track of different lineages of signal catalogs and the changes of definitions of elements for each signal, instead, the application just needs to use the EUUID to request the signal and interpret the meaning of the signal value.

In some cases, aside from the name of the signal, not all other elements of the vehicle signal are included in the combined string to generate the EUUID. In one example, the Name, Signal type, Data Type, Unit, Min, Max, Allowed, and Default are included, while the Description and Comment are not included. In another example, only the elements that may cause confusion of the interpretation of the signal, e.g., the Unit and the Data Type, are included together with the name of the signal in the combined string. In yet another example, only elements for which multiple lineages are available are included in the combined string. For example, if the data type of a signal may be an integer in one lineage but may be a float in another lineage, then the data type is included in the combined string. On the other hand, if the Min and Max are always the same for one signal for one vehicle model, Min and Max may not be included in the combined string.

The collection of elements that are included in the combined string (i.e., a list of which elements are included) to generate the EUUID can be defined in a protocol, e.g., the VSS. Alternatively, or additionally, the collection of elements that are included in the combined string to generate the EUUID can be available through a server or a website that is accessible to the application that requests the signal. Similarly, the hashing functions that are used to during the generation of the EUUID discussed previously can also be defined in the VSS or otherwise available to the application in a server or a website. In some cases, the EUUID of each vehicle signal for a particular vehicle can also be available to the application. In this case, the application can send a query to a server, e.g., the server 130 in FIG. 1, to query the EUUID of a signal of a particular vehicle. This way the application does not have to generate the EUUID itself.

In some cases, the request in 202 can include the EUUID of the requested signal. In one implementation, when an application connected to the vehicle or logs on to the vehicle at the beginning of a session, the application can send a joint request that include the EUUID of one or more signals that the application would request in the session. This way the application does not need to include the EUUID in every request for the vehicle signal throughout the session. Alternatively or in combination, the application can include the EUUID in each request for the vehicle signal throughout the session.

In some cases, the EUUID can be included as an additional element in the definition of each signal catalog node in the VSS. Alternatively, the EUUID can replace the UUID element, which only represents the information of the path name of the node, and the EUUID can be used to indicate the lineage of the signal in the signal catalog.

At 204, the vehicle transmits a response message comprising the vehicle signal to the party that requests the vehicle signal. In some cases, the response message includes an identifier of the vehicle signal that includes the definition of at least one element of the vehicle signal. For example, the response message can include the EUUID, as discussed previously.

In some implementations, the EUUID of each vehicle signal of the vehicle can be stored in the vehicle, e.g., in a memory device on the vehicle. These EUUIDs may be stored by the manufacture during the manufacturing process of the vehicle, e.g., when the operating system of the vehicle is installed in the vehicle. Alternatively, or additionally, the EUUIDs can be uploaded to the vehicle through a user interface of the vehicle, or through a server, e.g., the server 130 in FIG. 1. The EUUIDs can also be adjusted through a user interface of the vehicle or through a server, by the manufacturer of the vehicle, the operation administrator of the vehicle, the owner of the vehicle, the driver of the vehicle, or any combination thereof.

If the request in 202 includes the EUUID of the requested signal, the vehicle can search the EUUIDs of vehicle signals stored in the vehicle to determine whether the vehicle supports the signal with the corresponding EUUID. If the vehicle supports the signal with the EUUID, the vehicle can respond to the request by transmitting a response message to the application that requests the signal. The response message can include the current value of the signal. For example, if the EUUID corresponds to Vehicle.Speed, the response message can include the current speed of the signal. Furthermore, as discussed previously, the EUUID includes the definition of the elements of the vehicle signal (through concatenation, hash, or a combination thereof), including e.g., the Unit. Therefore, the response message does not need to include an indicator of these elements. For example, a signal Vehicle. Speed that has a definition of Unit as mile/hour will have a different EUUID as a signal, thus the value of the signal in the response message would correspond to the EUUID. For example, if the EUUID corresponds to the Unit being mile/hour, the value of the signal is in the unit of mile/hour. If the EUUID corresponds to the Unit being kilometer/hour, the value of the signal is in the unit of kilometer/hour. The Application can correctly interpret the value of the signal in the received response message without additional indicator of the Unit.

In some cases, the EUUID can be included in the response message with the value of the signal. In some cases, if the EUUID of the response message is the same as the requested message, the EUUID may be omitted in response message.

In some cases, the EUUID of the requested signal may not be supported by the vehicle. For example, the application requests the Vehicle. Speed in the Unit of mile/hour, the application can include the EUUID that corresponds to the definition of the Unit being mile/hour. The vehicle may not support such a EUUID because vehicle only supports Vehicle. Speed in the Unit of kilometer/hour and thus would support Vehicle. Speed with a different EUUID (which corresponds to the Unit of kilometer/hour). The vehicle can send a response message indicating that the requested signal is not supported. In some cases, the response message can include a cause indicator. The cause indicator can indicate that another EUUID of the same signal is supported. The response message can further include the other EUUID that is supported. In some implementations, the vehicle can also include both other EUUID and the value of the signal corresponding the other EUUID. The application can interpret the value of the signal based on the other EUUID. In some cases, the application may not be able to understand the meaning of the other EUUID because it may be difficult to determine the definition of each element included in the combined string that generates the EUUID after hashing function is used. The application can send a query to a server, e.g., the server 130 in FIG. 1, or search a website associated with the vehicle, to obtain the definition of each element for the EUUID. This enables the application to correctly interpret the value of the signal.

In some cases, as discussed previously, the application sends a joint request at beginning of the session. The joint request can include multiple EUUIDs of the signals that the application would request in the session. The application determines whether these EUUIDs are supported and send a joint response message to the application. The joint response message can indicate the list of the requested EUUIDs that are supported, the list of the requested EUUIDs that are not supported, the list of the requested EUUIDs that are not supported with corresponding alternative EUUIDs of the same requested signals. This helps the application to determine whether to use the alternative EUUIDs for the session, to obtain additional information to interpret the signal having supported EUUIDs, or refrain from requesting signals of unsupported EUUIDs in the session.

Similar to the procedure of using EUUID to obtain the value of a vehicle signal, i.e., a request for reading the signal, the EUUID can also be used for writing a vehicle signal. For example, the application can send a request to write a vehicle signal. The request can include an EUUID of the vehicle signal. The vehicle can determine whether the vehicle supports the EUUID. If the EUUID is supported, the vehicle can proceed to set the value of the vehicle signal according to the value in the request. If the EUUID is not supported, the vehicle can send a response message to reject the request. This prevents the vehicle from incorrectly setting the values of the vehicle signals. For example, setting the target temperature of cabin with a value in the unit of Celsius when the application intends the value to be in the unit of Fahrenheit. In some cases, the response message can also include an alternative EUUID of the same vehicle signal that the vehicle supports. This enables the application to resend the request with a value that corresponds to the alternative EUUID.

Figure 4:
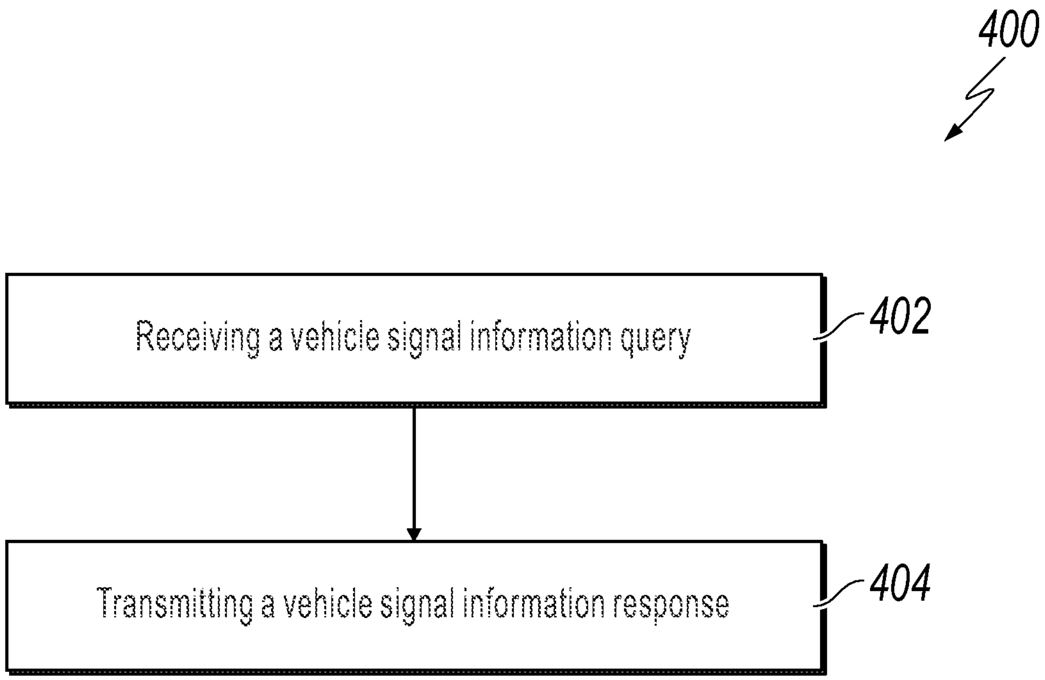
FIG. 4 is a flow diagram showing an example method that communicates vehicle signal information, according to an implementation.

FIG. 4 is a flow diagram showing an example method 400 that communicates vehicle signal information using the extended identifier, according to an implementation. The method 400 can be implemented by the entities shown in FIG. 1, including, for example, the vehicle 120, the application 122, the server 130, and any combinations thereof. The method 400 shown in FIG. 4 can also be implemented using additional, fewer, or different entities. Furthermore, the method 400 shown in FIG. 4 can be implemented using additional, fewer, or different operations, which can be performed in the order shown or in a different order. In some instances, an operation or a group of operations can be iterated or repeated, for example, for a specified number of iterations or until a terminating condition is reached.

At 402, a server, e.g., the server 130 in FIG. 1, can receive a vehicle signal information query. The vehicle signal information query can include a list of nodes in a vehicle signal catalog. The vehicle signal information query represents an information request of the extended identifiers (e.g., EUUID) discussed previously that is supported by one particular type of the vehicle. The vehicle signal information query can include the path names of the nodes for which the extended identifiers are requested, e.g., Vehicle. Speed.

In some cases, the vehicle signal information query can be sent by the application 122 in FIG. 1 discussed previously. Alternatively, the vehicle signal information query can be sent from a server or a device of the developer of the application 122. For example, the application developer tries to determine if the application can be deployed on a particular type of vehicle. The developer of the application 122 can use the vehicle signal information query to collect the extended identifiers that are supported by the particular type of the vehicle. This approach can ensure the application 122 to support the semantics of the vehicle signals of the particular type of the vehicle, where the semantics of vehicle signals (e.g., unit and data type) are captured in the extended identifiers as discussed previously.

At 404, the server can respond to the vehicle signal information query with a vehicle signal information response. The vehicle signal information response can be sent to the entity that sends the vehicle signal information query discussed previously. The vehicle signal information response can include the extended identifiers corresponding to the nodes in the vehicle signal information query.

Other approaches can also be used to convey the supported extended identifiers to the application 122 or the developer of the application 122. For example, the vehicle signal information query can include a list of extended identifiers (e.g., a list of extended identifiers based on the signal semantics supported by the application). If any of these extended identifiers are not supported by the particular type of the vehicle, the vehicle signal information response can indicate the extended identifiers that are not supported. In some cases, for the unsupported extended identifiers in the query, the server can identify the corresponding nodes and the vehicle signal information response can further include the extended identifiers for these nodes based on the signal semantics supported by the particular type of the vehicle.

In some cases, the application 122 can be developed to handle multiple extended identifiers for the same node. For example, the application 122 can handle the node vehicle speed with a first extended identifier (corresponding to the unit of km/h) and a second extended identifier (corresponding to the unit of mile/h). Based on the information exchange in the step 402 and 404, the application 122 can receive the information that one vehicle only supports the first extended identifier for the node vehicle speed. Therefore, when the application 122 interacts with such a vehicle, the application 122 can request the signal value of the node vehicle speed from the vehicle using the name or path of the node. After receiving the signal value from the vehicle, the application 122 can interpret the value using the correct unit, i.e., km/h. In some cases, the application 122 can convert the value in a different unit for further processing and outputting.

In some cases, prior to or during the application development, the application or the application developer can send a list of nodes (e.g., a list of node path names) to the server. The server can return a set of EUUIDs corresponding to these nodes supported by a signal catalog for a particular type of vehicle. Based on the EUUIDs, the application or the application developer is informed of the semantics of these nodes (e.g., the unit and the date type) used by the vehicle so that the developer can adapt the application to support the node semantics of the vehicle. In some cases, prior to the application deployment on the vehicle, the list of EUUIDs the application supports can also be checked against the list of EUUIDs the vehicle supports. If the two lists of EUUIDs match, the application can be deployed on the vehicle. If the two lists do not match, the list of EUUIDs the vehicle supports can be returned to the application. From the retuned EUUIDS, the application or the application developer can obtain the signal semantics the vehicle supports and the application can be adapted if the application supports different semantics.

Figure 3:
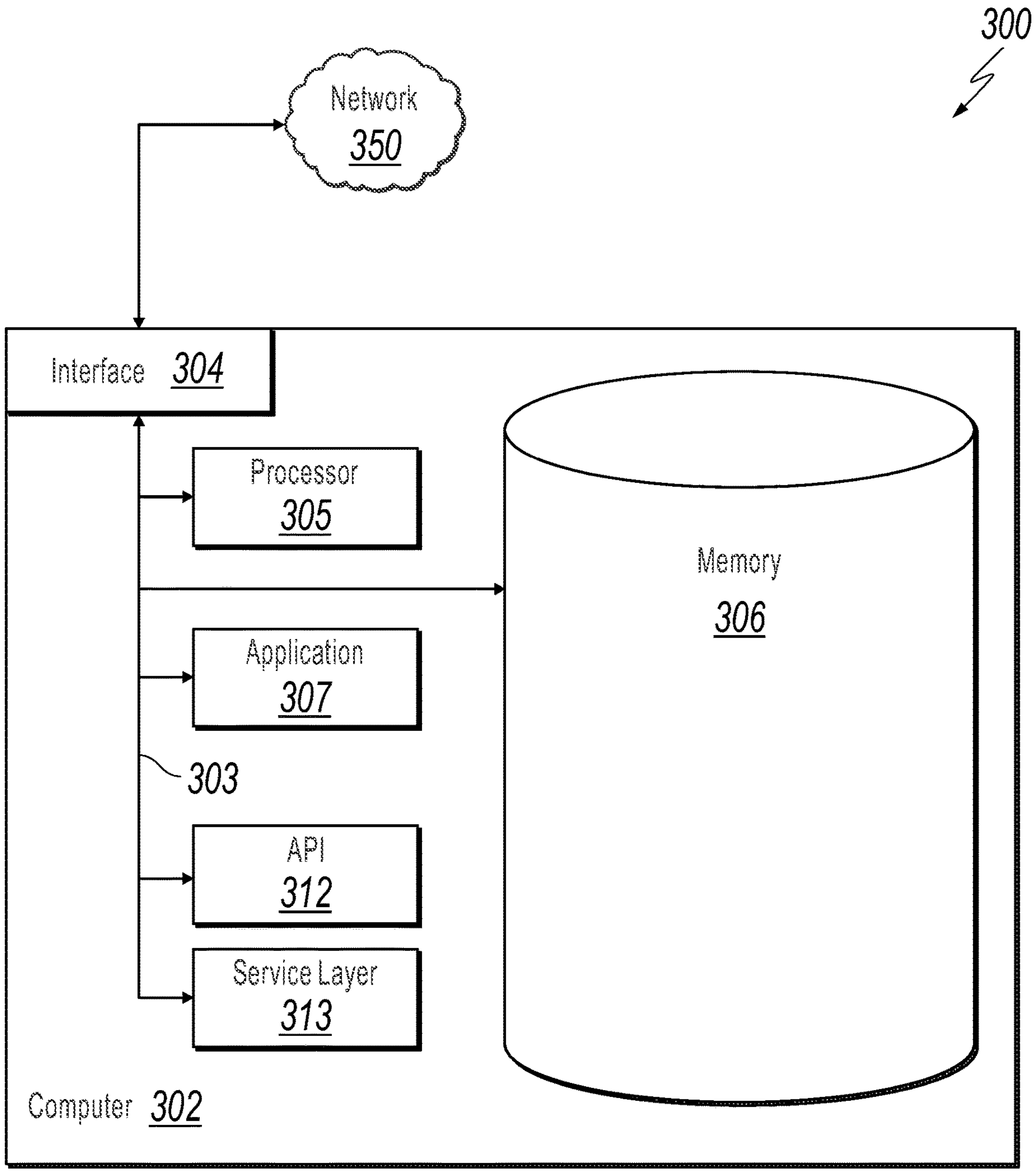
FIG. 3 is a high-level architecture block diagram of a computing system, according to an implementation.

FIG. 3 is a high-level architecture block diagram showing a computer 302 coupled with a network 350, according to an implementation. The described illustration is only one possible implementation of the described subject matter and is not intended to limit the disclosure to the single described implementation. Those of ordinary skill in the art will appreciate the fact that the described components can be connected, combined, or used in alternative ways, consistent with this disclosure.

The network 350 facilitates communications between the computer 302 and other devices. In some cases, a user, e.g., an administrator, can access the computer 302 from a remote network. In these or other cases, the network 350 can be a wireless or a wireline network. In some cases, a user can access the computer 302 locally. In these or other cases, the network 350 can also be a memory pipe, a hardware connection, or any internal or external communication paths between the components.

The computer 302 includes a computing system configured to perform the algorithm described in this disclosure. For example, the computer 302 can be used to implement the server 130 shown in FIG. 1. The computer 302 can be used to implement an electronic device that runs the application 122 shown in FIG. 1, e.g., as a laptop computer or a smart phone. The computer 302 can also be used to implement the vehicle signal control module 112 shown in FIG. 1. In some cases, the algorithm can be implemented in an executable computing code, e.g., C/C++ executable code. Alternatively, or in combination, the algorithm can be implemented in an application program, e.g., EXCEL. In some cases, the computer 302 can include a standalone LINUX system that runs batch applications. In some cases, the computer 302 can include mobile or personal computers that run the application program.

The computer 302 may include an input device, such as a keypad, keyboard, touch screen, microphone, speech recognition device, or another device that can accept user information, and/or an output device that conveys information associated with the operation of the computer 302, including digital data, visual and/or audio information, or a GUI.

The computer 302 can serve as a client, network component, a server, a database or other persistency, or the like. In some implementations, one or more components of the computer 302 may be configured to operate within a cloud-computing-based environment.

At a high level, the computer 302 is an electronic computing device operable to receive, transmit, process, store, or manage data and information. According to some implementations, the computer 302 may also include or be communicably coupled with an application server, e-mail server, web server, caching server, streaming data server, business intelligence (BI) server, and/or other server.

The computer 302 can receive requests over network 350 from a client application (e.g., executing on a user device) and respond to the received requests by processing said requests in an appropriate software application. In addition, requests may also be sent to the computer 302 from internal users (e.g., from a command console or by another appropriate access method), external or third parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303, using an application programming interface (API) 312 and/or a service layer 313. The API 312 may include specifications for routines, data structures, and object classes. The API 312 may be either computer language-independent or -dependent and refer to a complete interface, a single function, or even a set of APIs. The service layer 313 provides software services to the computer 302. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in Extensible Markup Language (XML) format or another suitable format. While illustrated as an integrated component of the computer 302, alternative implementations may illustrate the API 312 and/or the service layer 313 as stand-alone components in relation to other components of the computer 302. Moreover, any or all parts of the API 312 and/or the service layer 313 may be implemented as child or sub-modules of another software module or hardware module, without departing from the scope of this disclosure.

The computer 302 includes an interface 304. Although illustrated as a single interface 304 in FIG. 3, two or more interfaces 304 may be used according to particular needs, configurations, or particular implementations of the computer 302. The interface 304 is used by the computer 302 for communicating with other systems in a distributed environment connected to the network 350—(whether illustrated or not). Generally, the interface 304 comprises logic encoded in software and/or hardware in a suitable combination and operable to communicate with the network 350. More specifically, the interface 304 may comprise software supporting one or more communication protocols associated with communications such that the network 350 or the interface's hardware are operable to communicate physical signals.

The computer 302 includes a processor 305. Although illustrated as a single processor 305 in FIG. 3, two or more processors may be used according to particular needs, configurations, or particular implementations of the computer 302. Generally, the processor 305 executes instructions and manipulates data to perform the operations of the computer 302. In some cases, the processor 305 can include a data processing apparatus.

The computer 302 also includes a memory 306 that holds data for the computer 302. Although illustrated as a single memory 306 in FIG. 3, two or more memories may be used according to particular needs, configurations, or particular implementations of the computer 302. While memory 306 is illustrated as an integral component of the computer 302, in alternative implementations, memory 306 can be external to the computer 302.

The application 307 comprises an algorithmic software engine providing functionality according to particular needs, configurations, or particular implementations of the computer 302. Although illustrated as a single application 307, the application 307 may be implemented as multiple applications 307 on the computer 302. In addition, although illustrated as integral to the computer 302, in alternative implementations, the application 307 can be external to the computer 302.

There may be any number of computers 302 associated with, or external to, the system 300 and communicating over network 350. Further, the terms "client," "user," and other appropriate terminology may be used interchangeably, as appropriate, without departing from the scope of this disclosure. Moreover, this disclosure contemplates that many users may use one computer 302, or that one user may use multiple computers 302.

Described implementations of the subject matter can include one or more features, alone or in combination.

For example, in a first implementation, a method, comprising: receiving, at a server, a query for a vehicle signal; and transmitting, from the server, a response message comprising an identifier of the vehicle signal, wherein the identifier comprises a representation of a name of the vehicle signal and a definition of at least one other element of the vehicle signal.

The foregoing and other described implementations can each, optionally, include one or more of the following features:

A first feature, combinable with any of the following features, wherein the at least one other element comprises a unit or a data type of the vehicle signal.

A second feature, combinable with any of the previous or following features, wherein the identifier comprises a hashing product of a string that comprises the definition of the at least one other element of the vehicle signal.

A third feature, combinable with any of the previous or following features, wherein the query comprises the identifier of the vehicle signal.

A fourth feature, combinable with any of the previous or following features, wherein the query includes a path name for the vehicle signal.

A fifth feature, combinable with any of the previous or following features, wherein the query includes a first identifier of the vehicle signal, the identifier in the response message is a second identifier of the vehicle signal, the first identifier is based on a first definition of the at least one other element of the vehicle signal, and the second identifier is based on a second definition of the at least one other element of the vehicle signal.

A sixth feature, combinable with any of the previous features, wherein the vehicle signal is defined as a Vehicle Signal Specification (VSS) of Connected Vehicle Systems Alliance (COVESA).

In a second implementation, a server, comprising: at least one hardware processor; and one or more computer-readable storage media coupled to the at least one hardware processor and storing programming instructions for execution by the at least one hardware processor, wherein the programming instructions, when executed, cause the server to perform operations comprising: receiving, at the server, a query for a vehicle signal; and transmitting, from the server, a response message comprising an identifier of the vehicle signal, wherein the identifier comprises a representation of a name of the vehicle signal and a definition of at least one other element of the vehicle signal.

The foregoing and other described implementations can each, optionally, include one or more of the following features:

A first feature, combinable with any of the following features, wherein the at least one other element comprises a unit or a data type of the vehicle signal.

A second feature, combinable with any of the previous or following features, wherein the identifier comprises a hashing product of a string that comprises the definition of the at least one other element of the vehicle signal.

A third feature, combinable with any of the previous or following features, wherein the query comprises the identifier of the vehicle signal.

A fourth feature, combinable with any of the previous or following features, wherein the query includes a path name for the vehicle signal.

A fifth feature, combinable with any of the previous or following features, wherein the query includes a first identifier of the vehicle signal, the identifier in the response message is a second identifier of the vehicle signal, the first identifier is based on a first definition of the at least one other element of the vehicle signal, and the second identifier is based on a second definition of the at least one other element of the vehicle signal.

A sixth feature, combinable with any of the previous features, wherein the vehicle signal is defined as a Vehicle Signal Specification (VSS) of Connected Vehicle Systems Alliance (COVESA).

In a third implementation, a computer-readable medium storing instructions which, when executed, cause a computing device to perform operations comprising: receiving, at a server, a query for a vehicle signal; and transmitting, from the server, a response message comprising an identifier of the vehicle signal, wherein the identifier comprises a representation of a name of the vehicle signal and a definition of at least one other element of the vehicle signal.

The foregoing and other described implementations can each, optionally, include one or more of the following features:

A first feature, combinable with any of the following features, wherein the at least one other element comprises a unit or a data type of the vehicle signal.

A second feature, combinable with any of the previous or following features, wherein the identifier comprises a hashing product of a string that comprises the definition of the at least one other element of the vehicle signal.

A third feature, combinable with any of the previous or following features, wherein the query comprises the identifier of the vehicle signal.

A fourth feature, combinable with any of the previous or following features, wherein the query includes a path name for the vehicle signal.

A fifth feature, combinable with any of the previous or following features, wherein the query includes a first identifier of the vehicle signal, the identifier in the response message is a second identifier of the vehicle signal, the first identifier is based on a first definition of the at least one other element of the vehicle signal, and the second identifier is based on a second definition of the at least one other element of the vehicle signal.

A sixth feature, combinable with any of the previous features, wherein the vehicle signal is defined as a Vehicle Signal Specification (VSS) of Connected Vehicle Systems Alliance (COVESA).

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may, instead, include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include, by way of example, a programmable processor, a computer, a system on a chip, or multiple ones, or combinations of the foregoing. A processor can include special purpose logic circuitry, e.g., a CPU (central processing unit), an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random-access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from, a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or another suitable format. The API or service layer (or a combination of the API and the service layer) may be an integral or a stand-alone component in relation to other components of the computing system. Moreover, any or all parts of the service layer may be implemented as child or sub-modules of another software module, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:

receiving, at a server from a vehicle or an electronic device associated with the vehicle, a query for a vehicle signal, wherein the query includes a path name associated with a data entry node, wherein the data entry node represents the vehicle signal, and wherein the server is separate from the vehicle or the electronic device associated with the vehicle; and transmitting, from the server to the vehicle or the electronic device associated with the vehicle, a response message comprising an identifier of the vehicle signal, wherein the identifier indicates a name of the vehicle signal and the identifier comprises a hashing product of a string that comprises a description of at least one other element of the vehicle signal, wherein the hashing product is an output of a hashing function with the string that comprises the description as an input, and wherein the at least one other element of the vehicle signal comprises a unit or a data type of information that is represented by the vehicle signal.

2. The method of claim 1, wherein the query comprises the identifier of the vehicle signal.

3. The method of claim 1, wherein the query includes a first identifier of the vehicle signal, the identifier in the response message is a second identifier of the vehicle signal, the first identifier is based on a first description of the at least one other element of the vehicle signal, and the second identifier is based on a second description of the at least one other element of the vehicle signal.

4. The method of claim 1, wherein the vehicle signal is defined as a Vehicle Signal Specification (VSS) of Connected Vehicle Systems Alliance (COVESA).

5. A server, comprising:

at least one hardware processor; and one or more computer-readable storage media coupled to the at least one hardware processor and storing programming instructions for execution by the at least one hardware processor, wherein the programming instructions, when executed, cause the server to perform operations comprising:

receiving, at a server from a vehicle or an electronic device associated with the vehicle, a query for a vehicle signal, wherein the query includes a path name associated with a data entry node, wherein the data entry node represents the vehicle signal, and wherein the server is separate from the vehicle or the electronic device associated with the vehicle; and transmitting, from the server to the vehicle or the electronic device associated with the vehicle, a response message comprising an identifier of the vehicle signal, wherein the identifier a response message comprising an identifier of the vehicle signal, wherein the identifier indicates a name of the vehicle signal and the identifier comprises a hashing product of a string that comprises a description of at least one other element of the vehicle signal, wherein the hashing product is an output of a hashing function with the string that comprises the description as an input, and wherein the at least one other element of the vehicle signal comprises a unit or a data type of information that is represented by the vehicle signal.

6. The server of claim 5, wherein the query comprises the identifier of the vehicle signal.

7. The server of claim 5, wherein the query includes a first identifier of the vehicle signal, the identifier in the response message is a second identifier of the vehicle signal, the first identifier is based on a first description of the at least one other element of the vehicle signal, and the second identifier is based on a second description of the at least one other element of the vehicle signal.

8. The server of claim 5, wherein the vehicle signal is defined as a Vehicle Signal Specification (VSS) of Connected Vehicle Systems Alliance (COVESA).

9. A non-transitory computer-readable medium storing instructions which, when executed, cause a computing device to perform operations comprising:

receiving, at a server from a vehicle or an electronic device associated with the vehicle, a query for a vehicle signal, wherein the query includes a path name associated with a data entry node, wherein the data entry node represents the vehicle signal, and wherein the server is separate from the vehicle or the electronic device associated with the vehicle; and transmitting, from the server to the vehicle or the electronic device associated with the vehicle, a response message comprising an identifier of the vehicle signal, wherein the identifier a response message comprising an identifier of the vehicle signal, wherein the identifier indicates a name of the vehicle signal and the identifier comprises a hashing product of a string that comprises a description of at least one other element of the vehicle signal, wherein the hashing product is an output of a hashing function with the string that comprises the description as an input, and wherein the at least one other element of the vehicle signal comprises a unit or a data type of information that is represented by the vehicle signal.

10. The computer-readable medium of claim 9, wherein the query comprises the identifier of the vehicle signal.

11. The computer-readable medium of claim 9, wherein the query includes a first identifier of the vehicle signal, the identifier in the response message is a second identifier of the vehicle signal, the first identifier is based on a first description of the at least one other element of the vehicle signal, and the second identifier is based on a second description of the at least one other element of the vehicle signal.

* * * * *